Aug. 8, 1961  R. S. HINSEY  2,995,047
MECHANISM CONTROL
Original Filed Jan. 21, 1953  2 Sheets-Sheet 1
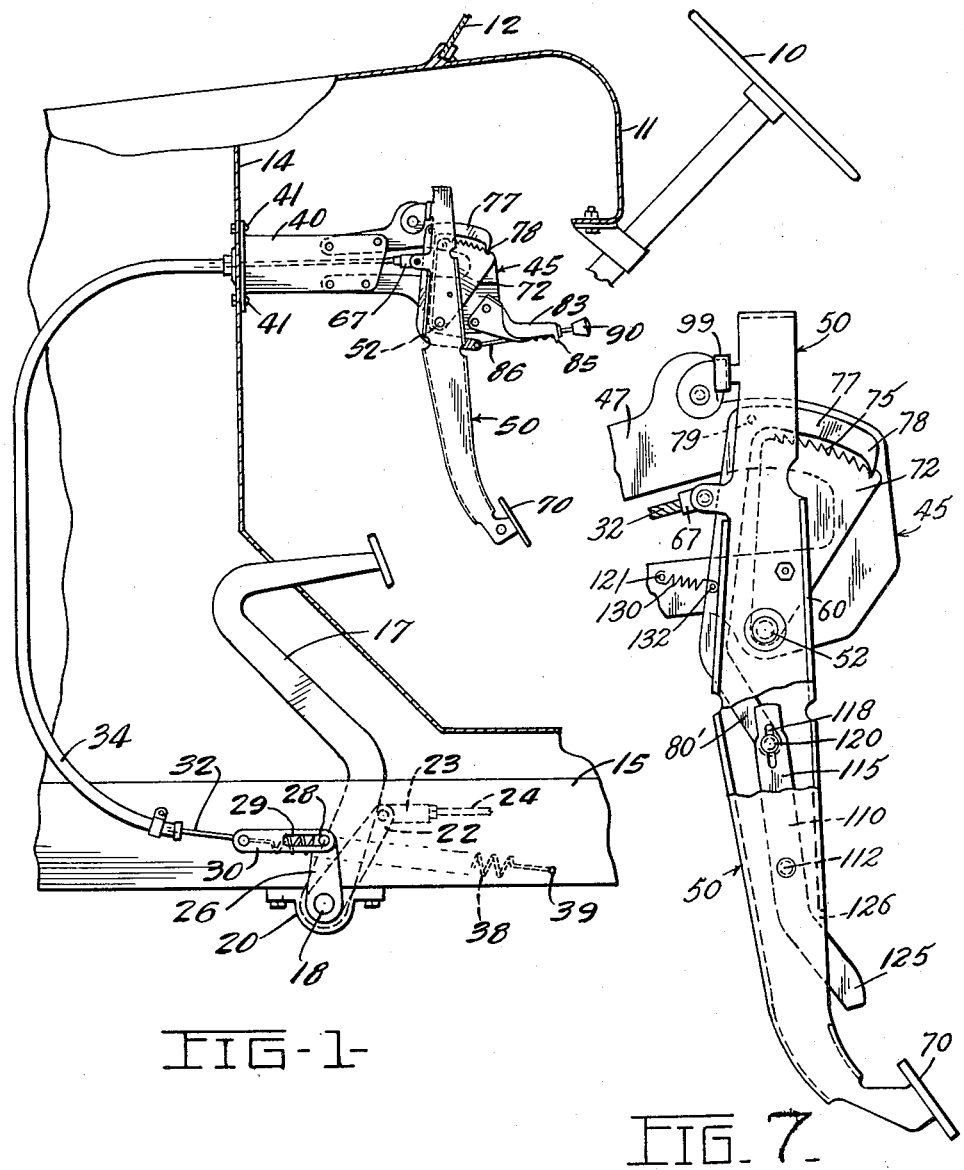
FIG-1-
FIG.7-
INVENTOR:
ROBERT S. HINSEY.
BY
Harry O. Ernsberger
ATTY.

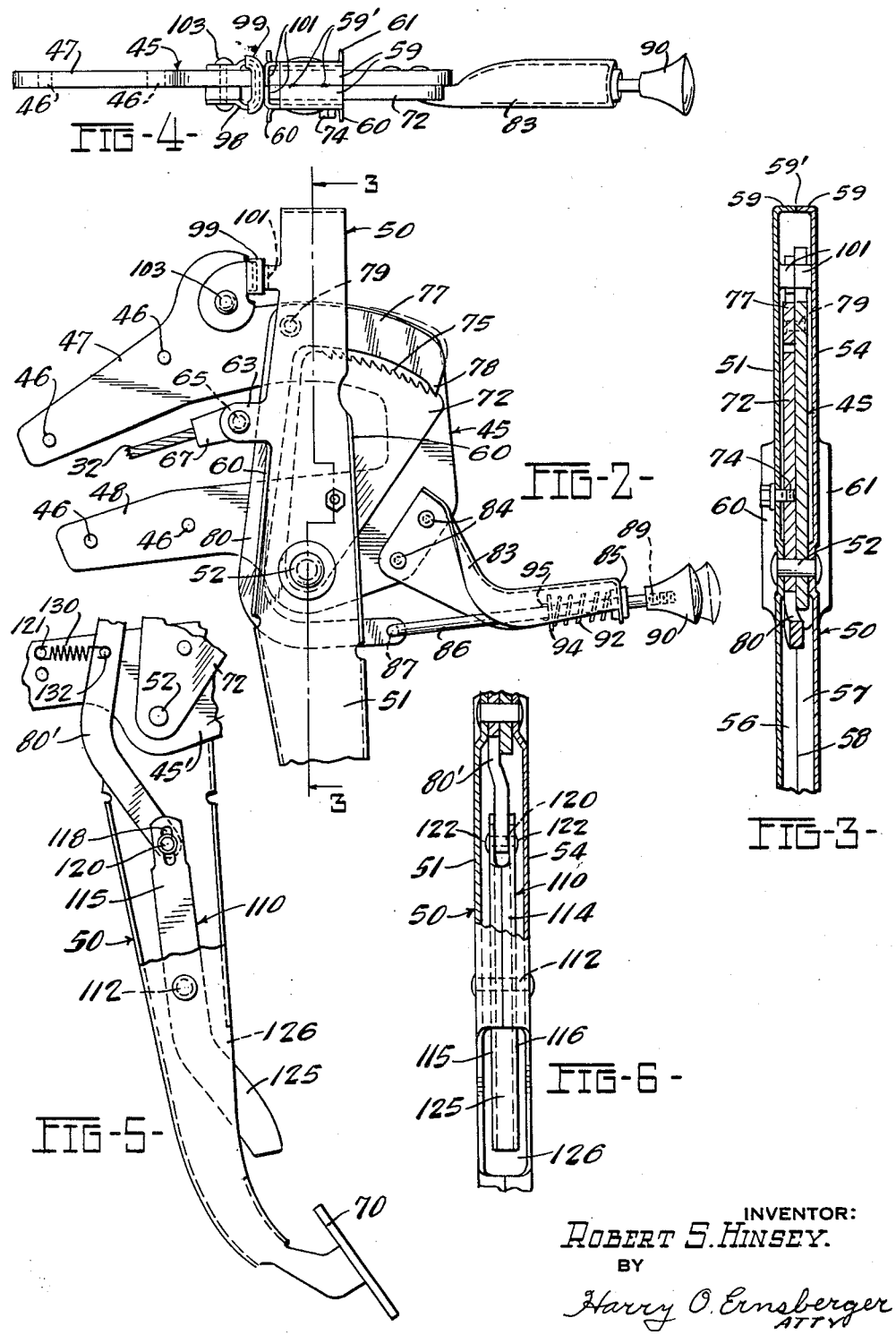

United States Patent Office
2,995,047
Patented Aug. 8, 1961

2,995,047
MECHANISM CONTROL
Robert S. Hinsey, Toledo, Ohio, assignor to The Bingham-Herbrand Corporation, Toledo, Ohio, a corporation of Ohio
Original application Jan. 21, 1953, Ser. No. 332,183, now Patent No. 2,872,830, dated Feb. 10, 1959. Divided and this application Nov. 3, 1958, Ser. No. 771,262
3 Claims. (Cl. 74—512)

This invention relates to mechanism control and more especially to means for actuating and controlling the braking mechanism or system of an automotive vehicle and is a voluntary division of my copending application Serial No. 332,183 filed Jan. 21, 1953, now Patent 2,872,830 issued February 10, 1959.

The invention embraces the provision of a foot-operated lever or lever structure adapted to be connected to braking mechanism of a vehicle, the lever structure having a clutching or retaining means of a character such that the lever structure may be retained in various positions of adjustment and wherein the clutching means may be released with a minimum of effort on the part of the operator.

An object of the invention resides in the provision of a foot-operated lever arrangement embodying clutching means for holding the lever in adjusted position and which may be readily released by means carried by or remotely positioned relative to the lever irrespective to the relative position of the brake-actuating lever, the arrangement being especially adapted for actuating and controlling the parking or emergency brake mechanism of a vehicle.

Another object of the invention is the provision of a foot-operated lever construction for actuating and controlling parking or emergency brakes of an automotive vehicle, the construction embodying a pawl member and ratchet means for holding the foot-operated lever in adjusted position wherein the pawl member is pivoted upon a relatively stationary support and is engageable with the ratchet means carried by the lever, the pawl having means integral therewith engaged by an element for effecting disengagement of the pawl member with the ratchet means.

Further objects and advantages are within the scope of this invention such as relate to the arrangement, operation and function of the related elements, to combinations of parts, elements per se, and to economies of manufacture and numerous other features as will be apparent from a consideration of the specification and drawing of a form of the invention, which may be preferred, in which:

FIGURE 1 is a fragmentary elevational view, certain parts being shown in section, illustrating a portion of the operator's compartment of a vehicle embodying a form of mechanism control of the invention;

FIGURE 2 is a side elevational view of a portion of the construction of mechanism control illustrated in FIGURE 1;

FIGURE 3 is a sectional view taken substantially on the line 3—3 of FIGURE 2;

FIGURE 4 is a top plan view of the construction shown in FIGURE 2;

FIGURE 5 is an elevational view of a lower portion of the lever construction of FIGURE 2 illustrating a form of foot-actuated means for releasing the lever-retaining or clutching means;

FIGURE 6 is an elevational view of the arrangement shown in FIGURE 5, certain parts being shown in section;

FIGURE 7 is an elevational view of the lever construction shown in FIGURE 1 incorporating the clutch control means illustrated in FIGURE 5.

While the forms of the invention of mechanism control are illustrated as utilized for actuating and controlling the emergency or parking brake mechanism of an automotive vehicle, it is to be understood that the invention may be used for actuating or controlling any apparatus where the same may be found to have utility.

Referring to the drawings in detail and initially to FIGURE 1, there is illustrated a portion of the operator's compartment of a vehicle. The portions of the vehicle illustrated include the steering wheel 10, an instrument panel 11, windshield 12, dashboard or fire wall 14, a chassis frame member 15 and a service brake pedal 17. The pedal 17 is mounted upon and secured to a transversely extending shaft 18 which is journaled in a pair of brackets 20, one of which is secured to frame member 15 and the other to a second frame member (not shown) disposed at the opposite side of the vehicle. Mounted upon the shaft 18 is an arm 22 which is connected by means of a clevis 23 and a rod or cable 24 to the brake shoes associated with vehicle wheels (not shown). Depression of the pedal 17 exerts a force in a lefthand direction as viewed in FIGURE 1 upon the rod 24 to set the brakes.

Also secured upon the shaft 18 is an arm 26 provided with a pin 28 at its extremity which is adapted for traverse in a slot 29 formed in a plate or link 30. One end of the plate 30 is secured to a flexible cable 32 which extends through a suitable guide or sheath 34 and is connected to the control apparatus of the present invention in a manner hereinafter described. A contractile spring 38 is anchored at one end as at 39 to the chassis frame member 15, the opposite end of the spring being connected to the plate 30 so as to bias the cable 32 to a brake-released position.

Mounted upon the dashboard or fire wall 14 is a bracket 40 secured to the wall by means of bolts 41. The lever construction of the present invention is mounted upon a support or member 45 which is bolted or riveted to the bracket 40 by means passing through openings 46 formed in projecting portions 47 and 48 of the support 45.

The mechanism control of the invention includes a lever or lever member 50 shown in FIGURES 1 through 3, the lever being fulcrumed upon the support 45 by means of a stub shaft or rivet 52. The lever construction is formed of two similarly shaped stampings 51 and 54 of sheet metal which have inwardly turned flanges 56 and 57 welded together along the line 58 providing a box-like construction. The upper ends of the sections 51 and 54 of the lever are provided with flanges 59 which are also joined by welding 59'.

The lever sections 51 and 54 are provided with outwardly projecting flanges 60 and 61 adjacent the zone of the fulcrum of the lever and where the lever straddles the support 45. The lever construction is provided with ear portions or projections 63 which are bored to accommodate a stub shaft or rivet 65. A clevis member 67 is disposed between the ear portions and has an opening to receive the stub shaft 65. The flexible cable 32 is anchored to the clevis 67 and operatively connects the lever 50 with the brake mechanism (not shown) through the mechanism illustrated in FIGURE 1 and hereinbefore described.

The depending portion of the lever construction 50 is formed with a foot pad 70 for manipulating the lever in a clockwise direction about its fulcrum shaft 52 to effect a setting of the vehicle brakes. Secured to and forming a part of the lever construction 50 is an element or plate 72 which is provided with an opening to accommodate the fulcrum shaft 52. The element or plate 72 is fixedly secured to section 51 of the lever construction by suitable means such as a bolt 74. It is to be understood that the component or plate 72 may be welded or otherwise secured to the section 51 or may be formed as an integral part of the lever construction 50. The plate 72 is of sector shape and is fashioned with a clutching surface 75. In the embodiment illustrated, the clutching surface may be serrated, presenting a plurality of ratchet teeth as particularly shown in FIGURE 2. The clutching surface 75 is adapted for cooperation with a clutch or pawl member 77 having a tooth or detent 78 adapted to engage the teeth of the clutching surface to hold the lever construction in an adjusted or brake-setting position.

As shown in FIGURES 2 and 3, the pawl member 77 is pivotally supported by means of a rivet 79 carried by the support 45. The pawl member 77 is formed with a depending arm or portion 80 which is adapted to be connected with a pawl or clutch-releasing means. In the embodiment illustrated in FIGURES 2 and 4, there is secured to the support 45 a member 83 which is fastened to the support by means of rivets 84. The member 83 is provided with a flange portion 85 having an opening to receive and accommodate a rod or shaft 86. One end of the rod 86 has a transversely extending portion 87 projecting into an opening formed in the lower end of the arm 80 of the pawl 77. The opposite end of the rod 86 is threaded as at 89 to receive a manipulating button or knob 90 which may be utilized to effect relative longitudinal movement of the rod 86 to release or disengage the pawl from the ratchet teeth 75.

The pawl 77 is associated or provided with means for biasing the pawl toward engaging position with the clutch surface 75. In the form of construction shown in FIGURE 2, an expansive coil spring 92 surrounds the shaft 86 and is disposed between the flange 85 and a disk or washer 94 secured on the shaft by means of a cotter key 95. The spring 92 exerts pressure lengthwise of the rod 86 and in a lefthand direction as viewed in FIGURE 2 and provides a resilient pressure or bias means for urging the detent 78 of the pawl 77 into engagement with the teeth 75 formed on the sector or plate 72.

The tension in the spring 38 shown in FIGURE 1 acting upon the cable 32 serves to retract the pedal lever 50 to brake-release position when the pawl tooth 78 is disengaged from the ratchet teeth 75. In order to minimize the shock resulting when the lever 50 is returned to brake-release position under the influence of spring 38, a sheet metal bracket 98, having a portion thereof covered with molded rubber 99, provides a resilient block or abutment which serves as a buffer for the lever. The sections 51 and 54 of the lever are formed with pad portions 101 adapted for engagement with the abutment 99. The bracket 98 may be secured to the support 45 by means of a rivet or stub shaft 103.

The operation of the lever construction shown in FIGURES 1 through 4 is as follows: When the operator desires to set the emergency or parking brakes of a vehicle, he exerts foot pressure upon the foot pad 70, swinging the lever 50 about its fulcrum shaft 52 in a clockwise direction as viewed in FIGURES 1 and 2. Such movement is transferred through the cable 32, link 30, arms 26 and 22 and rod 24 to set the vehicle brakes (not shown). As the spring 92 exerts a constant bias on the pawl member 77 urging the pawl 78 into engagement with the ratchet teeth 75, the pawl or detent 78 engages the adjacent tooth of the surface 75 and thus holds the lever construction 50 in brake-setting position. To release the brakes, the operator grasps the knob 90 and exerts longitudinal pull on the rod 86 in a righthand direction as viewed in FIGURE 2, compressing the spring 92 and pivoting the pawl member 77 about its support 79 to withdraw the pawl tooth 78 from engagement with the clutching surface 75. Upon disengagement of the pawl 78 with the clutching surface, the tension of spring 38 immediately oscillates the lever 50 in a counterclockwise direction as viewed in FIGURE 2 to effect release of the brakes, the buffer 99 serving to determine the initial or brake-release position of the lever 50.

It should be noted that the pawl member 77, being pivotally mounted upon the stationary support 45, enables the release or disengagement of the pawl from the clutching surface on the lever without regard to the relative position of the fulcrum of the lever. Thus the release means associated with the pawl member 77 may be mounted in any position with respect to the lever and satisfactorily operate to effect engagement or disengagement of the pawl in any position of adjustment of the lever.

FIGURES 5, 6 and 7 illustrate a modified form of releasing means for the pawl member 77 wherein the releasing means may be carried by the lever. In this form of construction a depending arm 80' of the pawl member 77 is connected to a pawl-actuating means in the form of an arm or auxiliary lever 110, forming a means for effecting a release of the clutching means or pawl member. The pawl-releasing means or auxiliary lever 110 is fulcrumed intermediate its ends upon a rivet or stub shaft 112 which extends through aligned openings formed in the sheet metal lever sections 51 and 54. The member 110 is of U-shaped configuration having a bight portion 114 and parallel wall portions 115 and 116. The rivet 112 passes through openings in the parallel walls 115 and 116 to support the arm or member 110. The depending extremity of the arm 80' of the pawl member and the upper extremity of the member 110 are joined by an articulate connection, preferably in the form of a pin and slot arrangement. As illustrated in FIGURE 5, for example, the arm 80' extends between the walls 115 and 116, the walls being provided with longitudinally extending slots 118. The arm 80' is provided with an opening through which extends a rivet or stub shaft 120 which also projects through the slots 118 in the walls of the member 110, the ends of the rivet 120 having head portions to restrain endwise movement thereof.

The lower portion of the member 110 may be shaped to extend in a righthand direction from the lever 50 as viewed in FIGURE 5, presenting a pad portion 125 which extends through an opening 126 formed in the sheet metal components or sections 51 and 54 of the lever. By exerting pressure upon the pad portion 125 of the auxiliary lever or member 110, the same may be rotated about the axis of the fulcrum 112 and, through the pin and slot connection between member 110 and the arm 80', the pawl 78 of the pawl member 77 (see FIGURE 2) may be disengaged from the clutching surface 75 to effect a release of the lever member from an adjusted position. A contractile coil spring 130 is anchored at one end to a pin 131 carried by the support 45', the other end of the spring being connected as at 132 to the arm 80', and serves to constantly urge or bias the pawl member 77 toward engagement with the clutching surface 75.

In the operation of the lever construction embodying the foot-operated release means as shown in FIGURES 5, 6 and 7, foot pressure applied to the foot pad 70 of the lever 50 oscillates the lever about its fulcrum 52 drawing the cable 32 in a righthand direction as viewed in FIGURE 2 to set the brakes. The spring 130 constantly and resiliently influences the pawl member 77 to engage the pawl 78 with an adjacent tooth in the clutching surface 75 to hold the brakes in set position. When it is desired to release the brakes, the operator exerts pressure upon the pad portion 125 of the auxiliary or pawl-releasing lever or member 110 to rotate the member 110 in a clockwise direction about the fulcrum or rivet 112 to swing the arm 80' about its pivot or support 79 to disengage the pawl 78 from the clutching surface 75 of the plate 72. In the use of the pawl-releasing construction shown in FIGURES 5, 6 and 7, the operator continues to exert slight pressure upon the pad 125 of the clutch-releasing arm 110 during the interval of time that the lever 50 is being returned to its normal or brake-release position under the comparatively high tension of the spring 38 connected with the cable 32 in the manner shown in FIGURE 1. The tension of the brake-releasing spring 38 is much greater than the tension of spring 130 connected to the pawl member.

After the lever 50 has reached brake-release position, that is, the position illustrated in FIGURE 2, the operator may then release all pressure from the pad 125, the spring 130 biasing the pawl tooth 78 into position to cooperate with the clutching surface on the lever construction when the lever construction is subsequently moved to brake-setting position.

It is apparent that, within the scope of the invention, modifications and different arrangements may be made other than is herein disclosed, and the present disclosure is illustrative merely, the invention comprehending all variations thereof.

What I claim is:

1. A control for a brake actuating mechanism including, in combination, a relatively stationary support, a foot-operated lever fulcrumed at an intermediate point to the support and connected to a brake actuating mechanism, a plate member carried by the lever and having a curved serrated surface which has a center of curvature coincident with the fulcrum of the lever member, a pawl member pivotally mounted at one end upon the support and arranged for engagement at its other end with the serrated surface for holding the lever at various positions of adjustment, an arm of greater length than the pawl member which extends in a direction transverse of the pawl member length, an end of the arm being integral with said one end of the pawl member, an element engaging the other end of the arm for effecting disengagement of the pawl member from the serrated surface, said element, arm, and pawl member comprising a pawl mechanism, and resilient means engaging the pawl mechanism for normally biasing the pawl member into engagement with the serrated surface.

2. A control for a brake actuating mechanism including, in combination, a relatively stationary support, a foot-operated lever fulcrumed at an intermediate point to the support and connected to a brake actuating mechanism, a plate member carried by the lever and having a curved serrated surface, a pawl member pivotally mounted at one end upon the support and arranged for engagement at its other end with the serrated surface for holding the lever member at various positions of adjustment, the pawl member extending in a direction at least substantially parallel to that of the chord of the curved serrated surface of the plate member when the lever is in brake release position, said pawl being spaced radially outward from the curved serrated surface, an arm of greater length than the pawl member which extends in a direction transverse of the pawl member length, an end of the arm being integral with said one of the pawl member, and manipulating means engaging the other end of the arm for effecting disengagement of the pawl member from the serrated surface.

3. A control for a brake actuating mechanism as set forth in claim 2 wherein the pawl and arm are in a common plane with the plate member, the pawl being of greater length than the arc of travel of the curved serrated surface, and the arm extends in the direction of and beyond the fulcrum of the lever.

References Cited in the file of this patent
UNITED STATES PATENTS

| | | |
|---|---|---|
| 898,416 | Watson | Sept. 8, 1908 |
| 1,823,695 | Moorhouse | Sept. 15, 1931 |
| 2,108,666 | Hall | Feb. 15, 1938 |
| 2,308,898 | Skareen | Jan. 19, 1943 |
| 2,587,725 | Hinsey | Mar. 4, 1952 |
| 2,694,945 | Jandus | Nov. 23, 1954 |
| 2,872,830 | Ninsey | Feb. 10, 1959 |